United States Patent [19]

Blume

[11] Patent Number: 5,382,957
[45] Date of Patent: Jan. 17, 1995

[54] SYSTEM AND METHOD

[75] Inventor: Richard J. Blume, Alexandria, Va.

[73] Assignee: The United States of America as represented by the Secretary of the Navy, Washington, D.C.

[21] Appl. No.: 456,828

[22] Filed: Dec. 19, 1989

[51] Int. Cl.⁶ .......................... G01S 13/87; G01S 13/78
[52] U.S. Cl. ......................................... 342/43; 342/45; 342/357
[58] Field of Search ............................ 342/43, 45, 357

[56] References Cited

U.S. PATENT DOCUMENTS

| | | | |
|---|---|---|---|
| 3,161,871 | 12/1964 | Staples et al. | 342/43 |
| 3,772,688 | 11/1973 | Smit et al. | 342/43 |
| 3,922,673 | 0/0000 | Bishop | 342/95 |
| 3,956,797 | 5/1976 | Leypold et al. | 342/43 |
| 4,077,005 | 2/1978 | Bishop | 342/357 |
| 4,599,620 | 7/1986 | Evans | 342/357 |
| 4,741,245 | 5/1988 | Malone | 89/41.03 |
| 4,799,062 | 1/1989 | Sanderford, Jr. | 342/450 |
| 4,860,352 | 8/1989 | Laurance et al. | 342/357 |

Primary Examiner—Gilberto Barron, Jr.
Attorney, Agent, or Firm—Thomas E. McDonnell

[57] ABSTRACT

An improved system and method for detecting and positively identifying with enhanced IFF techniques an object or target from an interrogator platform where the area outwardly of and about the platform is suitably surveyed for detecting an object and where the platform is on the earth's surface, in the air or space so long as the platform and detected object to be identified are both within the envelope defined by the Global Position System (GPS) or the like. The system for carrying out the method can be generally made up of a GPS receiver, a programmed central processor unit and combined transceiver/antenna means. The GPS receiver of any platform after detecting an object advantageously functions to obtain the platform geoposition. Then by suitable means or by the cooperation of the programmed processor and antenna means obtain the bearing of the detected object. The detected object is then interrogated with an encrypted IFF signal as to the estimated position of the detected object. The signal also includes a region of uncertainty about the estimated position to assure positive object identification. Although the improved system has extensive military applications, it may readily be used for peaceful purposes. Because signal directivity is not required, an antenna of simple omnidirectional design may be used for any platform and object as well as any set of different frequencies for interrogating and receiving a response to the interrogation.

21 Claims, 3 Drawing Sheets

SYSTEM AND METHOD

SYSTEM AND METHOD

This invention concerns a system and method for identifying an object (target) from a platform that is disposed anywhere along the earth surface, in the air or space; and, more particularly, it relates to an improved system and method not only for detecting an object from a platform but also for identifying with enhanced IFF techniques the detected object therefrom where the platform may be disposed anywhere in the air, space or along the earth surface so long as both the platform and the detected object to be identified are encompassed by the Global Position System (GPS) and operatively associated therewith so that the platform and object are both capable of receiving navigation data from the GPS or the like.

BACKGROUND OF THE INVENTION

Various developments have been provided in the past for either detecting an object (target) to be identified or providing a geoposition. For example, U.S. Pat. No. 3,922,673 to W. B. Bishop concerns an object identification system where the interrogating platform or station provides an encoded signal to the object being interrogated to identify itself. U.S. Pat. No. 4,599,620 to A. G. Evans concerns a method for determining the orientation (attitude) of a platform by use of the (GPS) and graphically plotted data that is obtained from tracked satellites of the GPS. As the result of obtaining this data, a selective time fix is obtainable for indicating change-in-range and in turn platform orientation. U.S. Pat. No. 4,741,245 to D. K. Malone discloses an apparatus and method for aiming mobile artillery (tanks) where the apparatus and method utilizes the GPS for determining the geoposition of two tanks so as to enable the determination of a reference line between the two tanks prior to determining the azimuth of a target. U.S. Pat. No.4,799,062 to H. Britton Sanderford Jr. et al. discloses a method and apparatus for locating the position of an unknown radio transmitter by the use of a series of differently located repeater stations and a mobile reference transmitter along with a central monitoring station. However, none of the aforediscussed references whether taken alone or in any combination remotely suggest the improved compact and simplified system and method for use with a platform not only for detecting an object but also for identifying the detected object by use of enhanced IFF techniques where the platform is either stationary or movable and where the platform is movable along the earth's surface, in the air or space so long as the platform and the detected object to be identified are both enveloped by the Global Position System (GPS) or the like for enabling positive identification of the object (target).

SUMMARY OF THE INVENTION

An object of the invention is to provide an improved system and method for a platform (whether movable or stationary) not only for detecting an object or target but also for positively identifying same by use of enhanced IFF techniques so long as both the platform and detected object to be identified are both disposed within the envelope defined by the earth-orbiting satellites of the GPS.

Another object of the invention is to provide an improved system and method not only for detecting an object from a platform but also for identifying the detected object therefrom where both the platform and the detected object to be identified are encompassed by the GPS whether it is on the earth-surface, or in the air or space and where the various components of the system are readily retrofittable into any platform without normally adversely affecting its payload or performance.

Still another object of the invention is to provide an improved system and method not only for detecting an object from a platform but also for identifying the detected object by use of enhanced IFF techniques that can be advantageously provided with GPS receiver means, programmed central processor means and combined transceiver/antenna means all for the purpose of obtaining the geoposition of the platform prior to obtaining the bearing, range and altitude as well as positive identification of an object (if a friend) with minimized risk as to mistaken identity despite any relative movement between the platform and the object being identified.

And yet another object of the invention is to provide an improved system and method where any platform can have short range requirements in detecting and identifying an object, where the antenna of the platform can be of simplified omnidirectional design, and where any desired set of different frequencies is used by the platform for interrogating and receiving a response to the interrogation.

In summary, the improved system and method is generally made up of an interrogation platform and a detectable object (target) to be identified where regardless of the different dispositions of the platform and object such as along the earth's surface, in the air or space, they are always encompassed by the plurality of relatively spaced satellites of the Global Position System (GPS). It is to be understood that both the platform and object, in being encompassed by the GPS, are always within range of three or more GPS satellites and the electrical signals therefrom. The platform can be generally made up of GPS receiver means, programmed central processor (PCP) means and combined transceiver/antenna means. It is noted here in carrying out the invention that the object to be identified knows or should know its position prior to being interrogated such as by use of its own GPS receiver or some other suitable means. Similarly, a platform instead of a GPS receiver may also use any suitable means for knowing its geoposition. In an operative embodiment, a user of the platform in attempting to identify a detectable object, first determines its own current geoposition or navigation position in terms of latitude, longitude and altitude. In order for a platform to detect an object to be identified, the platform can survey its surrounding area in various ways such as, e.g., by the platform user's eyesight with or without a visual aid or by a scanning radar surveillance signal from the antenna means of the platform. Then, the PCP means in response to this position data and in conjunction with its combined transceiver/antenna means, first determines a true north reference line in relation to the platform and then the bearing of the detected object to be identified. Then, the platform after determining the bearing and at least approximate range of the detected object to be identified, transmits as an enhanced IFF technique an encrypted signal to the object including its estimated navigation position within a region of uncertainty so as to minimize risk of mistaken identity despite any relative movement between the platform and the object being identified. Since various components of the improved system on the platform are normally used for other purposes, the system is capable of being readily retrofittable onto a platform without normally adversely affecting its performance or payload requirements.

In another embodiment of the invention especially where an object to be identified is beyond viewing range of the user of a platform, the platform can obtain the approximate bearing of the object to be identified by receiving separate navigation data from another source or platform such as a reconnaissance aircraft within view of the detected object to be identified. Then, the improved system and method after obtaining the current geoposition of the platform by use of the GPS receiver can then determine an outwardly extending and divergent region of uncertainty centrally disposed about the approximate bearing of the detected object to be identified prior to transmitting an IFF encrypted coded signal having an estimated position of the detected object to be identified along with a region of uncertainty about the object position.

It is to be understood that depending on the use of the platform, the predetermined region of uncertainty about an object to be identified can be of any suitable shape such as circular, outwardly diverging or even three dimensional such as, e.g., the uncertainty region being of ellipsoidal shape. Regardless of the antenna design used with a platform, omnidirectional or otherwise, the platform in obtaining its navigation position, bearing to the detected object to be identified and then predetermining the region of uncertainty about the platform estimated position of the detected object to be identified assures that the PCP means of the platform will only evaluate a response (or nonresponse) from an interrogated object within the region thereby effectively preventing acceptance of a mistaken identity of an interrogated object (friend or foe) outside of the predetermined region. Moreover, an omnidirectional antenna can be used (instead of an antenna of complex design and signal directivity requirements) as well as any set of different frequencies for interrogating the detected object and receiving a response from the object after the interrogation.

In view of the foregoing other objects and advantages of the improved system and method will become further apparent when taken in conjunction with the drawings, specification and claims as follows:

DETAILED DESCRIPTION OF THE INVENTION

Figure 1:
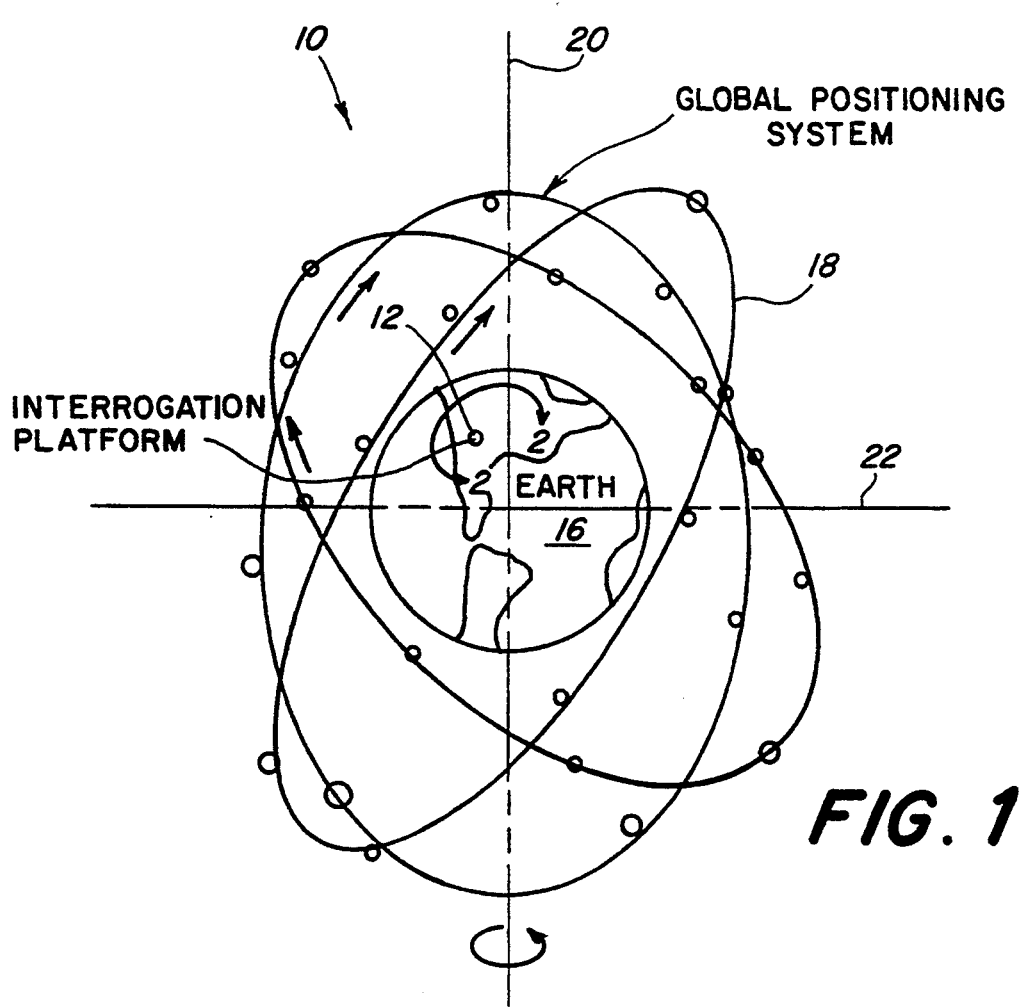
FIG. 1 is a combined perspective and diagrammatic view on a reduced scale of the earth encompassed by the earth-orbiting satellites of the GPS and illustrates an interrogator platform along the earth's surface that incorporates an embodiment of the improved system and method for detecting and identifying an object (not shown); with the improvement having enhanced IFF techniques.
Figure 2:
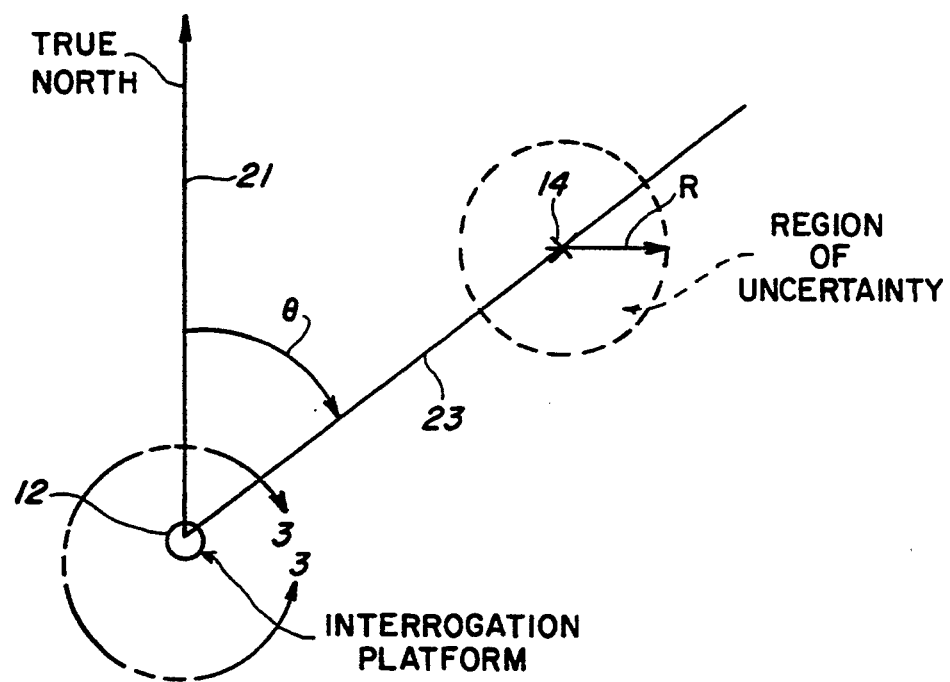
FIG. 2 is an enlarged diagrammatic view taken within the bounds of encompassing line 2—2 of FIG. 1 with parts added and other parts removed and illustrates further details of the invention.

With further reference to the drawings, FIG. 1 thereof illustrates an embodiment of an improved system and method 10 with enhanced IFF techniques that is generally made up of an interrogator's platform 12 for detecting an object (target) 14 to be identified (see FIG. 2) where the area about the platform is surveyed by the platform user's eyesight with or without a visual aid when the detectable object to be identified is viewable from the platform. As best shown in FIGS. 1-2, both the platform and the object to be identified are disposed somewhere along earth surface 16. At the same time, the improved system and method is advantageously operatively associated with the Global Position System (GPS) 18; and both the platform and the object are fully encompassed thereby.

The GPS is generally made up of twenty-four (24) earth orbiting satellites and three angularly related longitudinally oriented orbital planes. Each plane is provided with a group of eight orbiting GPS satellites of the plurality of twenty-four. Each satellite of a given orbital plane is uniformly and equally spaced relative to the other satellites thereof about the outer periphery of its associated plane in generally concentric relation to the earth so as to be in a half synchronous orbit of about 11,000 miles above the earth. Each GPS orbit is of circular extent with adjoining orbital planes being separated by an angle of about one hundred twenty degrees (120°) at the equator 22. As the result of this longitudinal and angular disposition of the GPS orbital planes in relation to each other, normally four or more GPS satellites are always in the field of view of both interrogation platform 12 and the detectable object to be identified regardless of their relative geopositions on the earth surface, in the air or space. As the result of both the platform and the detectable object to be identified being encompassed by the GPS, the platform user (regardless of the platform geoposition) is always able to determine its navigation position at any time and to accurately interrogate a detected object to be identified as will now be described below. It is to be understood that the GPS could be configured other than shown in FIG. 1. For example, there could be six orbital planes with each orbital plane having four earth-orbiting satellites, with adjoining planes being separated by an angle of sixty degrees (60°) and with each plane defining an angle of about fifty-five degrees (55°) in relation to equator 22.

Once the platform user obtains current navigation data by use of the GPS or some other suitable means as to the platform position in terms of latitude, longitude and altitude, then the platform user can (by some suitable means, such as e.g., a magnetic compass) readily determine a true north reference line 21 and bearing angle theta (Θ) between its line of sight 23 to viewable detected object 14 and the true north reference line as depicted in FIG. 2. Once the platform user has the bearing of the viewable and detected object to be identified, the platform user can estimate the navigation position of the object to be identified as well as determine a region of uncertainty of a desired geometrical configuration about the estimated position of the object. In this instance, the uncertainty region is of circular shape as shown in FIG. 2. Since the detected object being identified knows its geoposition by also having its own GPS receiver, the encrypted platform signal with enhanced IFF techniques not only incorporates, the estimated position of the detected object but also the coordinates for a circular-shaped region of uncertainty about the estimated position of object 14. Then, only object 14 will answer an interrogating signal if a friend; unless an adversary is capable of otherwise providing a false response because of deciphering or breaking the encrypted signal in some fashion. If the object is not a friend and assuming no deciphering of the encrypted interrogation signal then the platform will normally have some means to immediately destroy object 14 when the detected object fails to timely and correctly respond to the encrypted interrogation signal.

Figure 3:
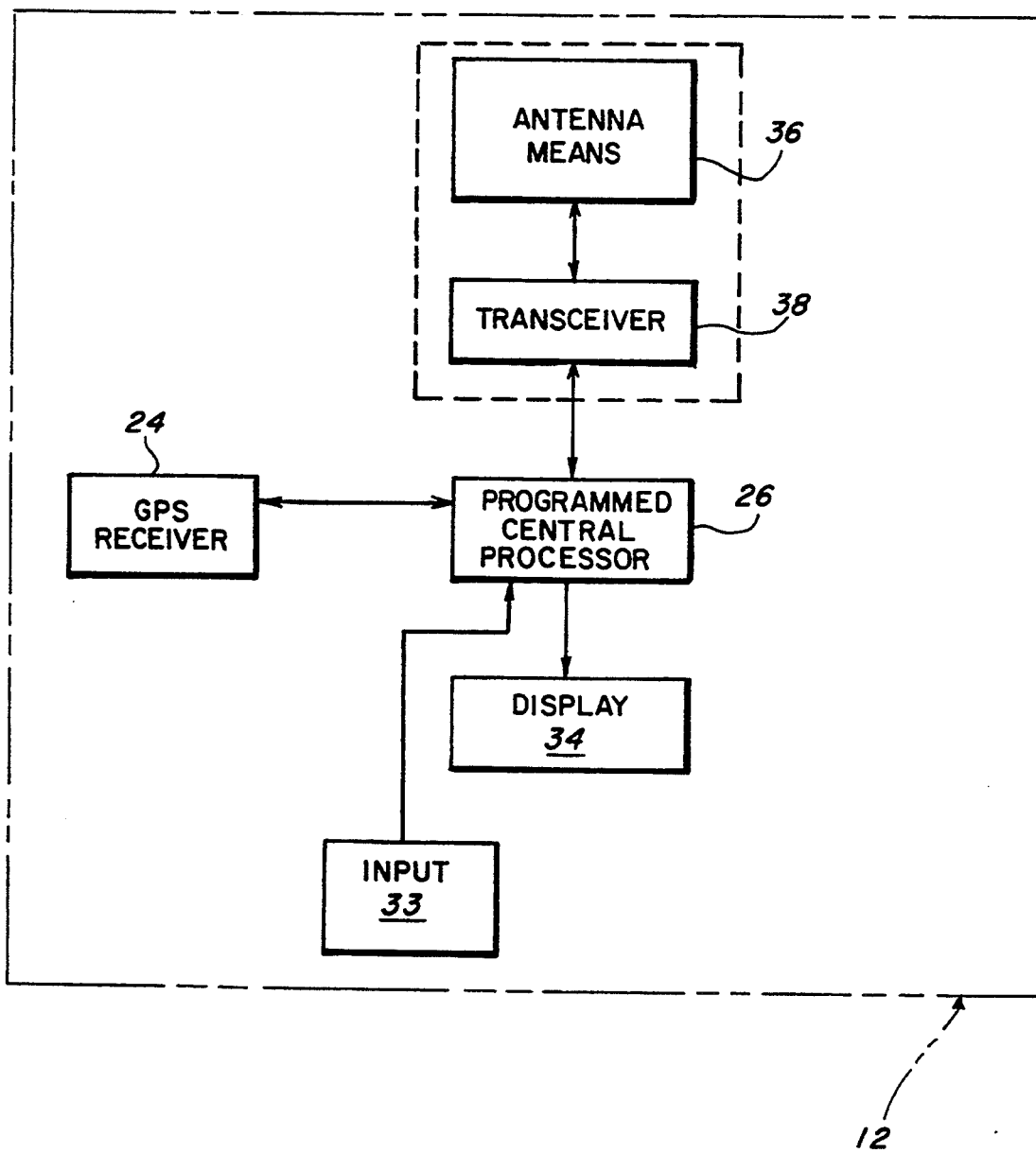
FIG. 3 is an enlarged schematic view of another embodiment of the invention, within the bounds of encircling line 3—3 of FIG. 2, with parts added and other parts removed; and illustrates various details of a plurality of components of the improved system for carrying out the invention.

In order to advantageously carry out identification of an object by the platform user, in accordance with the invention, reference is made to FIG. 3 as illustrative of another operative embodiment of the platform. As best shown in this FIG., the platform is generally made up of a GPS receiver 24, a programmed central processor (PCP) means 26, an input 33, a display 34 and a combined antenna 36 and transceiver means 38. The combined antenna and transceiver means are serially interconnected to the PCP means. The GPS receiver is separately connected to the PCP means. It is to be understood that the GPS receiver is any suitable microstructure design that can track and analyze signals from up to four GPS satellites in providing the geoposition of platform 12, namely its longitude, latitude, altitude and in real time. During any operative cycle, the PCP means can store the platform geoposition data in a suitable memory means such as, e.g., a RAM (not shown). Then by some suitable means the platform can independently determine the direction of true north at the platform position prior to determining the true bearing of a detected object.

Since the platform user, in one embodiment, can view the detectable object to be identified, the user can aim antenna means 36 at the detected object for radar surveillance so that a radar echo signal can be received by transceiver 38 from the object so that its range can be determined. Once the range or line of sight is determined to the object to be identified then the bearing angle can be determined between true north and the range to the object. Also if desired, any platform may incorporate an inertial navigation system (INS) (not shown) as an auxiliary back up. This backup may be required if either the GPS satellite signals are jammed by an adversary or for some reason the GPS receiver on the platform malfunctions for a period of time.

Figure 4:
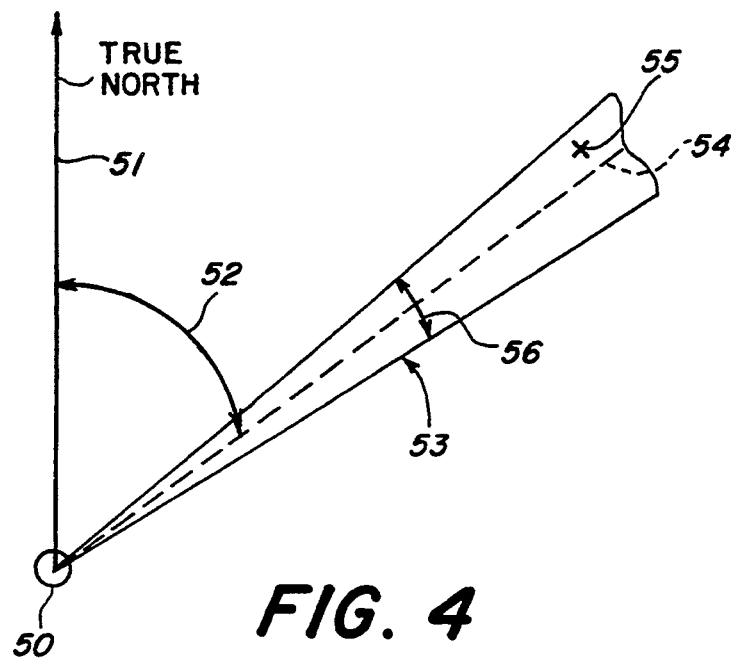
FIG. 4 is an enlarged diagrammatic view similar to FIG. 2 and illustrates another operative mode of the improved system and method especially when the object to be identified is beyond the viewing range of the platform user.

As best illustrated in FIG. 4, the user of a platform 50 may want to survey a particular area outwardly and about the platform and in a direction generally outwardly thereof. This type of survey preferably by surveillance radar is for detecting one or more nonviewable objects, such as object 55, to be interrogated for identification purposes. To this end, the platform could use combined means 36 and 38 along with PCP means 26 for transmitting a wedge-shaped outwardly divergent surveillance radar beam 53 of desired maximum range and angular extent 56 all about a central axis 54. Once an object is detected, the platform can readily determine its true north reference line 51, bearing angle 52 to the axis of the beam, platform position, etc. as aforedescribed. Then, the platform can interrogate the detected object by transmitting an enhanced IFF signal having a range corresponding to that of the radar beam as well as an estimated position of the detected target along with a region of uncertainty about the estimated position.

In other words, the wedge-shaped region is the physical coverage provided by the surveillance radar along and above the earth's surface as well as the region of uncertainty provided by the IFF equipment being used in accordance with the invention teachings. Even if the IFF signal is physically omnidirectional because of the IFF antenna being used on the platform, the message content from the IFF antenna only addresses whatever detectable objects are located within the radar beam.

Figure 5:
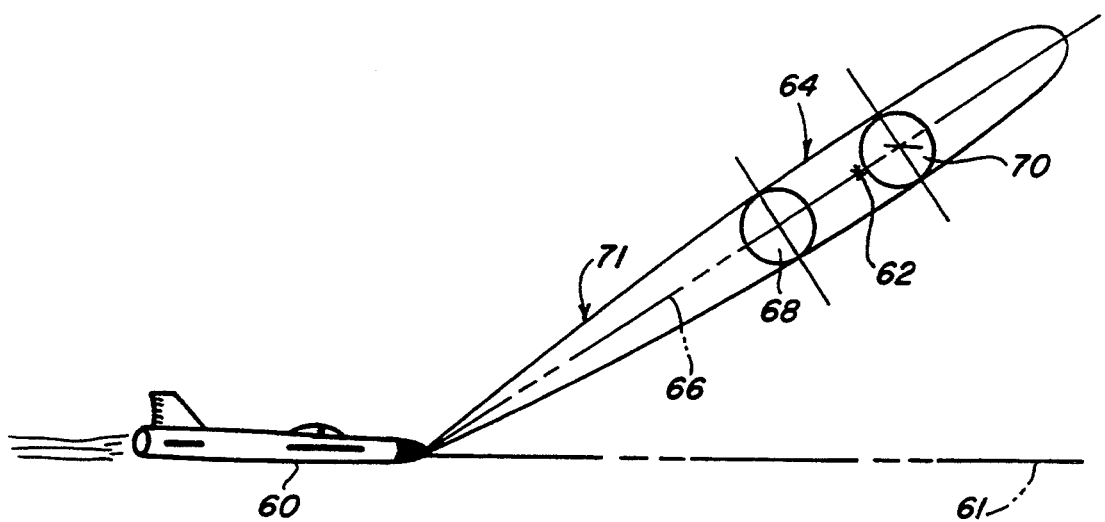
FIG. 5 is a combined perspective and diagrammatic view that illustrates a region of uncertainty of ellipsoidal shape in relation to a platform and for enabling identification of a detected object in space when the platform is a high performance aircraft.

As indicated in FIG. 5, a platform 60 can be a high performance aircraft moving along its flight path 61. The aircraft is provided with a pencil beam, target-tracking radar of desired maximum range and generally ellipsoidal shape. As the result of this radar, an echo signal indicates, e.g., along an axis 66 a detected nonviewable object 62 to be identified. Since the airplane always knows its position, it can readily estimate the position of the detected, nonviewable object. Then the IFF equipment of the platform transmits a message content whose address is for interrogating the detected target at its estimated position.

At the same time, this IFF message content defines a region of uncertainty 64 of approximately columnar shape as evidenced by the parallel relatively spaced end sections 68 and 70 in transverse and centered relation to axis 66. Depending on the suspected relative movements between object 62 and platform 60, the space between sections 68 and 70 can be of greater or smaller extent than shown. Hence, depending on the operating requirements of a platform in identifying a detected object that is either viewable or nonviewable, the PCP means can provide a region of uncertainty of any desired size and any suitable two-or three dimensional geometrical configuration in order to assure identification of a detected object in carrying out the invention.

By reason of the PCP means of any platform of the invention being advantageously programmed in some fashion to provide a defined region of uncertainty about a detected object to be identified, the improved system is capable of using a simplified omnidirectional antenna design of nominal size without adversely affecting positive identification of a detected object. Since the invention is not limited to a particular antenna design and even though different frequencies are used for interrogating and responding to the interrogation, these different frequencies need not be standardized but any set of different frequencies could be used so long as the requirements of a platform in identifying a detected object in relation to the platform's particular use can be met. It should now be evident that the improved system and method with enhanced IFF techniques is a simplified and highly reliable approach that has extensive utility and almost universal application for not only detecting an object but also for identifying a detected object with enhanced IFF techniques so long as the platform and object to be identified are both encompassed by the GPS. It is almost impossible for any adversary, because of the high costs and risks that would be involved, to be able to destroy all GPS satellites. At best, an adversary could attempt to jam a platform using the invention but with limited results. Although it is evident that the platform could be an aircraft, spacecraft, land vehicle or surface vessel, it could also be a portable platform such as used, e.g., by a foot soldier. It should now be evident because a region of uncertainty of some suitable size and configuration is required in identifying any detected object in accordance with the invention, neither interrogation signal directivity by use of a complex, extensive antenna design is required nor do any side lobes result in objectionable interference.

Obviously, many modifications and variations of the present invention are possible in light of the above teachings. It is therefore to be understood that, within the scope of the appended claims, the invention may be practiced otherwise than as specifically described.

What is claimed:

1. A system for identifying a detectable object by use of the plurality of satellites of the global positioning system GPS, said system comprising:
   platform means having survey means for surveying outwardly of and about the platform means and in any direction relative thereto for detecting an object to be identified, the platform means also having GPS receiver means, the GPS receiver means for receiving signals from a plurality of three satellites for determining the geoposition of the platform means in terms of latitude and longitude, all in real time; the platform means and a detected object to be identified being encompassed by the satellites of the GPS, and
   the platform means upon the survey means detecting an object including first means for determining the estimated position of the detected object and a predetermined region of uncertainty thereabout, the platform means having second means for transmitting an interrogation signal incorporating the estimated position of the detected object and the region of uncertainty thereabout to the detected object so that the detected object after being interrogated by the interrogation signal can respond with a signal for clearly identifying same to the platform means.

2. A system as set forth in claim 1 wherein the survey means can be effected by the eyesight of the user of the platform means.

3. A system as set forth in claim 1 wherein the survey means together with the first and second means is all effected by both a programmed central processor PCP means and a combined antenna and transceiver CA/T means, wherein the GPS receiver means, the PCP means and the CA/T means are interconnected together, and wherein the PCP means and CA/T means cooperate for transmitting a surveillance radar signal of suitable configuration for scanning the area outwardly of and about the platform means and in any direction for detecting an object to be identified.

4. A system as set forth in claim 3 wherein the antenna means is omnidirectional.

5. A system as set forth in claim 1 wherein the platform means is surface means.

6. A system as set forth in claim 1 wherein the platform means is an aircraft.

7. A system as set forth in claim 1 wherein the platform means is a spacecraft.

8. A system as set forth in claim 1 wherein the region of uncertainty is of circular-shaped configuration.

9. A system as set forth in claim 1 wherein the region of uncertainty is of wedge-shaped configuration and diverging as it extends outwardly from the platform means.

10. A system as set forth in claim 1 wherein the geoposition of the platform means is determined by a plurality of four satellites in terms of latitude, longitude and altitude, all in real time.

11. A system as set forth in claim 1 wherein the interrogation signal of the platform means and response signal of the detected object to be identified are at different frequencies after the detected object is interrogated by the interrogation signal thereof.

12. A system as set forth in claim 1 wherein the interrogation signal is encrypted.

13. A method for identifying a detectable object from a platform where both the platform and the object to be identified are encompassed by the plurality of satellites of the Global Position System GPS of the like, the method comprising the steps of:
   surveying the area outwardly of and about the platform for detecting an object to be identified,
   determining the geoposition of the platform in terms of latitude and longitude, all in real time, by the use of signals from a series of three satellites of the GPS once an object has been detected as the result of a survey in relation to the platform,
   next determining the bearing of the detected object,
   then determining the estimated position of the detected object including a region of uncertainty about the detected object in relation to its estimated position after the bearing of the detected object is determined, and
   transmitting a signal from the platform for interrogating the detected object to be identified such that the signal incorporates both the estimated position of the detected object and the region of uncertainty thereabout.

14. A method as set forth in claim 13 wherein the step of surveying is effected by the eyesight of the user of the platform with or without a visual aid.

15. A method as set forth in claim 13 wherein the step of surveying is effected by the platform having programmed control processor PCP means, and combined antenna and transceiver CA/T means such that the PCP means and CA/T means are interconnected and cooperate in transmitting a radar surveillance signal of suitable configuration for scanning the area outwardly of and about the platform at a desired range for detecting an object to be identified where the object is located in the scanned area and within the desired range.

16. A method as set forth in claim 13 wherein at least the object-to-be-identified is moving relative to the platform.

17. A method as set forth in claim 13 wherein the platform is a surface vehicle.

18. A method as set forth in claim 13 wherein the platform is an aircraft.

19. A method as set forth in claim 13 wherein the platform is a spacecraft.

20. A method as set forth in claim 13 wherein the step of determining the geoposition of the platform is effected by the platform having a GPS receiver.

21. A method as set forth in claim 13 wherein the step of transmitting a signal is effected at one frequency, and wherein the platform in response to its transmitted signal receiving a signal at a different frequency from the detected object after the detected object is interrogated.

* * * * *